(No Model.) 2 Sheets—Sheet 1.

J. H. ALBRIGHT.
CULTIVATOR.

No. 289,055. Patented Nov. 27, 1883.

Witnesses:

Inventor:
James H Albright
by Doubleday & Bliss
attys.

(No Model.) 2 Sheets—Sheet 2.

J. H. ALBRIGHT.
CULTIVATOR.

No. 289,055. Patented Nov. 27, 1883.

Witnesses
Inventor
James H. Albright

UNITED STATES PATENT OFFICE.

JAMES H. ALBRIGHT, OF LAURELTON, PENNSYLVANIA.

CULTIVATOR.

SPECIFICATION forming part of Letters Patent No. 289,055, dated November 27, 1883.

Application filed April 25, 1833. (No model.)

*To all whom it may concern:*

Be it known that I, JAMES H. ALBRIGHT, a citizen of the United States, residing at Laurelton, in the county of Union and State of Pennsylvania, have invented certain new and useful Improvements in Cultivators, of which the following is a specification, reference being had therein to the accompanying drawings.

Heretofore cultivators have been made with guards or fenders more or less adapted to prevent stones, clods, or other objectionable materials from being thrown upon the plants in proximity to which the machines moved. These, however, as heretofore made and attached to the frame, I have found to be troublesome and inconvenient when used with two-wheeled cultivators having crank-axles for vertical adjustment, as machines of the latter character present difficulties in the matter of management while in use that are not met with in using the cultivators of the simpler forms.

The object of my invention is to provide cultivators of this class with fenders or guards for the plants which shall be capable of instant adjustment horizontally, and which shall adjust themselves to different positions vertically.

Figure 1:
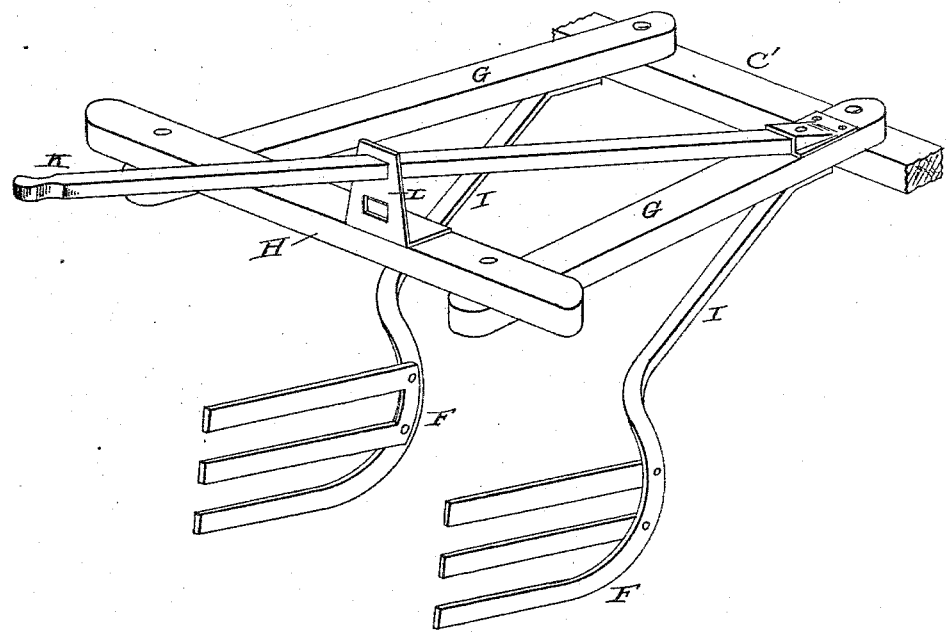
Figure 2:
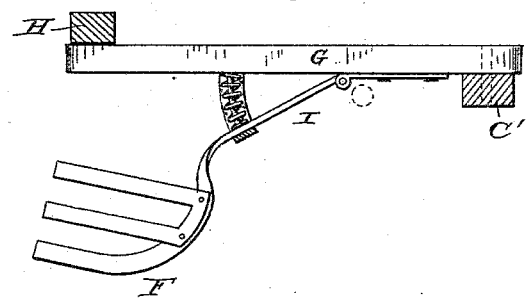
Figure 3:
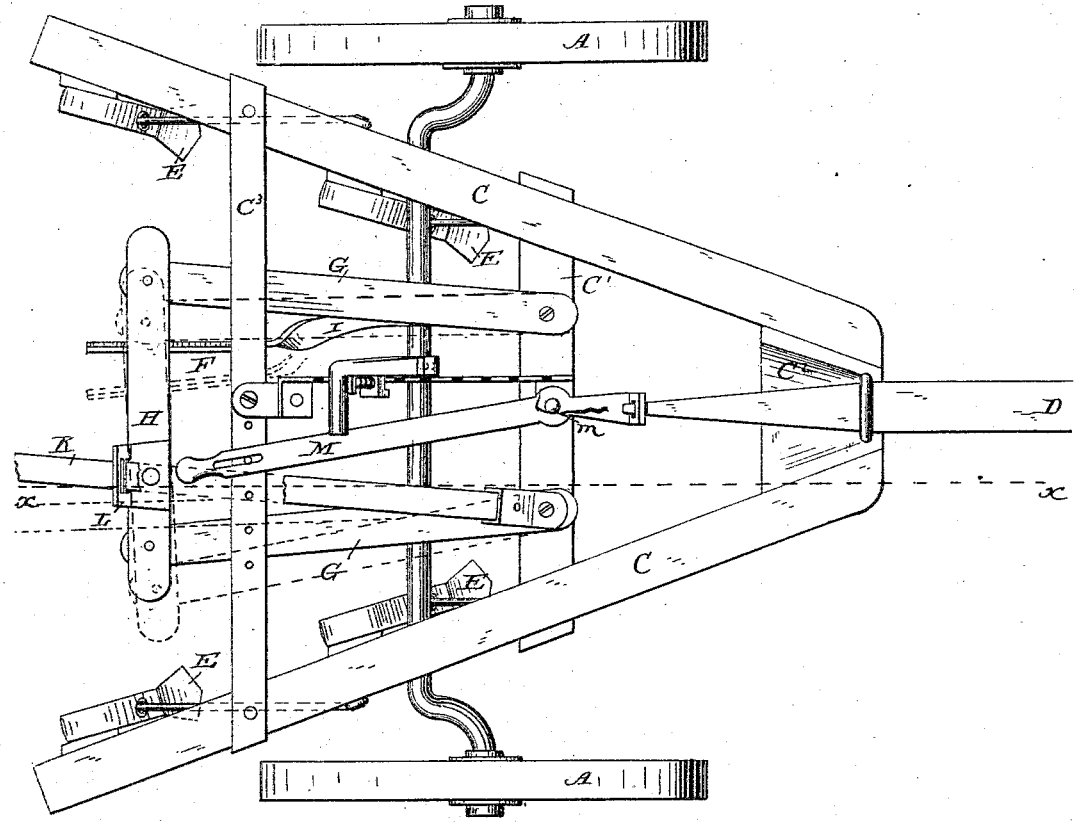
Figure 4:
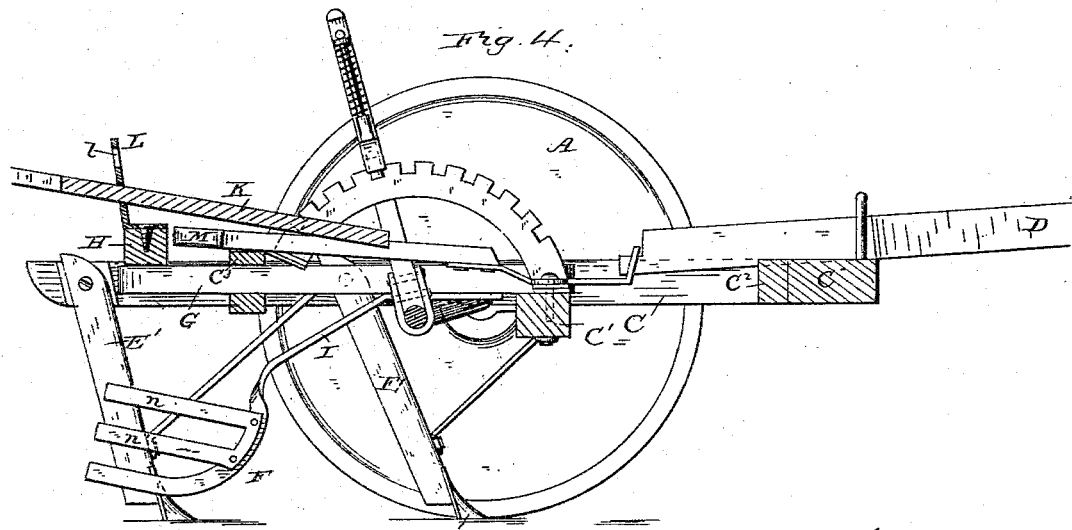

Figure 1 is a perspective of one form of fenders and of the swinging frame carrying them. Fig. 2 is a sectional view of a similar frame, showing a modified form of fender-support. Fig. 3 is a plan view of the cultivator having the improvements applied thereto. Fig. 4 is a longitudinal section of the machine in Fig. 3.

In the drawings, A represents the supporting-wheels upon which the frame is mounted. B is a crank-axle.

C C' C² C³ represent the longitudinal and transverse parts of the main frame, the whole being substantially triangular, and upon the apex portion C² rests the tongue D. Upon this frame are supported the cultivator-shovels E E, carried by the legs E' E', secured to the frame, which may be of any preferred construction. These shovels are so arranged as to thoroughly stir up and pulverize the soil over which the machine is passing, the machine being especially adapted for the cultivating of standing plants in rows. When used for this last-mentioned purpose, the shovels tend to throw more or less of the soil, clods, stones, &c., inward toward the row. To prevent this I employ a swinging frame having horizontally-adjustable fenders or guards. The swinging guard-frames consist of the longitudinal bars G G, pivotally connected to the cross-bar C' of the main frame, and at their rear ends pivotally connected to the cross-bar H. The fenders or guards F are held at a proper vertical position by means of springs, which may be either formed separately from the fender-supports, as in Fig. 2, or formed integrally therewith. The latter form of construction is the one which I have shown in Figs. 1 and 4 in the drawings—that is to say, the rods or arms I I are made of flat spring-steel, the tension of which can be adjusted to the work ordinarily required of it, and which, at their forward ends, are secured to the under side of the swinging frame. If from variations in the direction of the row, or from variations in the movement of the machine, the fenders or guards are in danger of being thrown too near or too far therefrom, the operator can instantly adjust them properly by means of a lever, K, pivotally connected by a detachable pin at its front end to one of the bars G, and passing though a bracket, L, secured to the cross-bar H. These parts are so arranged as not to interfere with the means by which is effected an adjustment of the rear end of the tongue, the latter consisting of a swinging lever, M, pivoted at *m* to the cross-bar C', and loosely engaging with the rear end of the tongue. It is necessary to have these last-mentioned adjusting means situated as near as possible to the longitudinal central line of the machine, and therefore to avoid interference therewith I pivot the lever K, as above described, directly to the fender-frame, and run it through a bracket, also carried by the fender-frame. The bracket L is cast or otherwise constructed with a series of apertures, *l*, which allow the rear end of the lever to be set at different heights vertically to accommodate the height of the driver. The bracket is so situated as to throw the rear end of the lever K inward to bring it over the central longitudinal line of the machine. The fenders or guards are made of bars N N, of flat metal, preferably steel, the front edge being rounded or curved downwardly and backwardly to offer as little resistance as possible.

What I claim is—

1. The combination of the supporting-wheels, the main frame, the horizontally-swinging fender-frame or guard-frame mounted on the main frame, the fenders or guards F F, carried by the horizontally-swinging frame, the lever M, situated on the central longitudinal line of the machine, for adjusting it relatively to the tongue, and the eccentrically-arranged lever K, pivoted to the swinging guard-frame, and having its rear end situated centrally behind the machine, substantially as set forth.

2. The combination of the supporting-wheels, the main frame, the horizontally-swinging fender-frame or guard-frame mounted thereon, the fenders or guards F F, carried by said swinging frame, the lever M, situated on the central longitudinal line, for adjusting the machine relatively to the tongue, the inclined lever K, and the bracket L, secured to the swinging frame, and provided with a vertical series of apertures, substantially as set forth.

In testimony whereof I affix my signature in presence of two witnesses.

JAMES H. ALBRIGHT.

Witnesses:
 JACKSON BROWSE,
 HORACE D. CRAWFORD.